Patented May 13, 1952

2,596,742

UNITED STATES PATENT OFFICE 2,596,742

N-SUBSTITUTED ETHYLENE THIOUREAS

Remsen S. Vaughn and Frederic R. Bean, Rochester, N. Y., assignors to Eastman Kodak Company, Rochester, N. Y., a corporation of New Jersey No Drawing. Application March 22, 1950,
Serial No. 151,306

14 Claims. (Cl. 260—309.7)

This invention relates to ethylene thioureas containing a phenolic group attached to a nitrogen atom, and to a process for their preparation.

Ethylene thiourea (2-imdazolidinethione) and N-substituted ethylene thioureas have been known for some time. For example, H. E. Newman, in Ber. d. Deutsche Chem. Ges., vol. 24, page 2191 (1891), describes the preparation of N-phenyl-N,N'-ethylene thiourea by condensing N-phenyl ethylene diamine with carbon disulfide. S. Gabriel et al., ibid., vol. 28, page 2935, also describe the preparation of N-phenyl-N,N'-ethylene thiourea, but employ a different process, i. e., by reacting ethyleneimine with phenyliso thiocyanate. More recently, N-hydroxymethyl ethylene thioureas and ethers thereof have been described by W. J. Burke, in U. S. Patent 2,374,647, dated May 1, 1945, and by F. W. Hoover et al., in U. S. Patent 2,373,136, dated April 10, 1945. However, none of the prior art has described phenolic group containing ethylene thioureas.

We have now found that valuable ethylene thioureas which can be represented by the following structural formula:

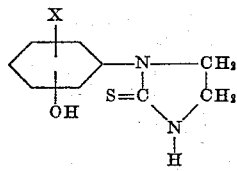

wherein X represents an atom of hydrogen or an atom of chlorine, can be prepared by condensing β - aminoethyl - aminophenols or β - aminoethyl-aminochlorophenols with carbon disulfide. The above defined N-hydroxyphenyl- or N-hydroxy chlorophenyl-N,N'-ethylene thioureas are water-soluble, substantially white crystalline compounds which are not alone valuable as intermediates but more especially valuable as toning agents in photographic processes, as sensitizers for photographic silver halide emulsions, as antioxidants for fats and oils and as biological chemicals.

It is accordingly, an object of our invention to provide a new class of N-substituted ethylene thioureas. Another object is to provide a process for preparing the same. Other objects will become apparent hereinafter.

In accordance with the invention, the new N-substituted ethylene thioureas are prepared by reacting a diamine selected from those having the general formula:

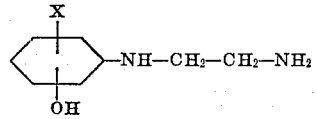

wherein X has the meaning previously given, with carbon disulfide and recovering the N-substituted ethylene thiourea which forms by conventional methods for separating a product from its reaction mixture such as filtering, concentration and crystallization. Advantageously, the diamine is employed in salt form, for example, as the hydrochloride, hydrobromide, phosphate, oxalate, sulfate, etc. preferably as the sulfate salt, in which case an alkaline substance is also added to the reaction mixture to free the amine so that the reaction can proceed. Advantageously, a small excess of carbon disulfide can be employed, but satisfactory results can also be obtained with equal molar quantities of the diamine and carbon disulfide. The reaction can be carried out advantageously in an inert liquid medium which is a solvent for the reactants, for example, in water, in ethyl alcohol or in a mixture of water and alcohol. The temperature of the reaction can be varied widely from 20° to 110° C., but preferably at the temperatures such as is obtained by refluxing the reaction mixture containing the inert solvent. The reaction can be carried out under either atmospheric or pressure conditions in this temperature range. Advantageously an inert atmosphere is employed. Where the reaction is carried out in an inert solvent medium, the concentration of the reactants can be varied within wide limits, it being possible to carry out the reaction in relatively dilute solutions as low as one per cent or in quite concentrated solutions up to 20% or even higher, but for practical operation a concentration of 8 to 15% of the reactants is preferred. The alkaline substance employed is advantageously a strongly basic inorganic compound such as an alkali metal carbonate or hydroxide (e. g. sodium carbonate, potassium carbonate, sodium hydroxide, potassium hydroxide, lithium hydroxide, etc.). The amount of alkaline substance employed is advantageously sufficient to at least neutralize all of the acid released from the diamine salt, although much larger quantities can be employed, if desired.

More specifically, the diamines which can be employed with carbon disulfide to prepare the compounds of our invention include the free amines and salts of N-β-aminoethyl-p-aminophenol, N-β-aminoethyl-o-aminophenol, N-β-aminoethyl-m-aminophenl, N-β-aminoethyl-4-hydroxy-3-chloro-aminobenzene, N-β-aminoethyl-2-hydroxy-3-chloro-aminobenzene, N-β-aminoethyl-3-hydroxy-4-chloroaminobenzene, etc. The above type of diamines can be prepared by reacting various bromophenols or various bromochlorophenols with ethylene diamine as described in our copending application Serial No. 38,174, filed July 10, 1948.

The following examples will serve further to illustrate our new N-substituted ethylene thioureas, and process for their preparation.

*Example 1.—N-p-hydroxyphenyl-N,N'-ethylene thiourea*

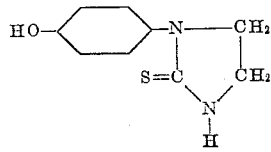

(a) 50 g. (0.2 mol) of N-β-aminoethyl-p-aminophenol sulfate were dissolved in 100 cc. of water containing 16 g. (0.4 mol) of sodium hydroxide. To this solution, there were added 300 cc. of ethyl alcohol and 16 g. (0.21 mol) of carbon disulfide, and the mixture was then heated at refluxing temperature (approximately 80° C.) until the evolution of hydrogen disulfide had ceased. The sodium sulfate which settled out as an insoluble precipitate was filtered off and the filtrate diluted with 300 cc. of water and boiled to remove most of the alcohol. The resulting liquor on cooling yielded nearly substantially white crystals of N-p-hydroxyphenyl-N,N'-ethylene thiourea having a melting point of 185°–186° C.

| Analysis | Calculated | Found |
|---|---|---|
| C | 55.7 | 55.6 |
| H | 5.2 | 5.1 |
| N | 14.4 | 14.5 |
| S | 16.5 | 16.7 |

(b) 75 g. (0.3 mol) of N-β-aminoethyl-p-aminophenol sulfate were dissolved in 250 cc. of water containing 25 g. (0.63 mol) of sodium hydroxide. To this solution there were added 25 g. (0.33 mol) of carbon disulfide, and the mixture was then refluxed on a steam bath until the evolution of hydrogen sulfide ceased. The reaction mixture was char-filtered hot and the filtrate then cooled. A good yield of substantially white crystals of N-p-hydroxyphenyl-N,N'-ethylene thiourea was obtained. After two recrystallizations from water, the melting point of the crystals was 185°–186° C.

*Example 2.—N-o-hydroxyphenyl-N,N'-ethylene thiourea*

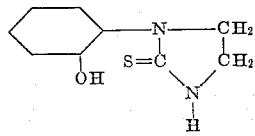

50 g. (0.2 mol) of N-β-aminoethyl-o-aminophenol sulfate were reacted with 16 g. (0.21 mol) of carbon disulfide, in the presence of 16 g. (0.4 mol) of sodium hydroxide, by the procedure described in Example 1. The crystals of N-o-hydroxyphenyl-N,N'-ethylene thiourea obtained had a melting point of 168°–169° C.

| Analysis | Calculated | Found |
|---|---|---|
| C | 55.7 | 55.7 |
| H | 5.2 | 5.6 |
| N | 14.4 | 14.5 |
| S | 16.5 | 16.2 |

*Example 3.—N-4-hydroxy-3-chlorophenyl-N,N'-ethylene thiourea*

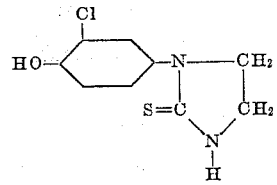

57.1 g. (0.2 mol) of N-β-aminoethyl-4-hydroxy-3-chloro-aminobenzene sulfate were reacted with 16 g. (0.21 mol) of carbon disulfide, in the presence of 16 g. (0.4 mol) of sodium hydroxide, by the procedure described in Example 1. The crystals of N-4-hydroxy-3-chlorophenyl-N,N'-ethylene thiourea obtained had a melting point of 219° C. The analysis of this compound gave the following values:

| Analysis | Calculated | Found |
|---|---|---|
| C | 46.4 | 47.2 |
| H | 3.90 | 3.94 |
| N | 12.6 | 12.3 |
| S | 13.7 | 14.0 |
| Cl | 15.3 | 15.5 |

Other N-substituted ethylene thioureas wherein the substituent is a phenolic group can also be prepared by proceeding as shown in the foregoing examples. For example, N-β-aminoethyl-m-aminophenol sulfate with carbon disulfide and sodium hydroxide gives N-m-hydroxyphenyl-N,N'-ethylene thiourea, N-β-aminoethyl-2-hydroxy-3-chloro-aminobenzene sulfate salt with carbon disulfide and sodium hydroxide gives N-2-hydroxy-3-chlorophenyl-N,N'-ethylene thiourea and N-β-aminoethyl-3-hydroxy-4-chloro-aminobenzene sulfate salt with carbon disulfide and sodium hydroxide gives N-3-hydroxy-4-chlorophenyl-N,N'-ethylene thiourea.

What we claim is:

1. A compound having the general formula:

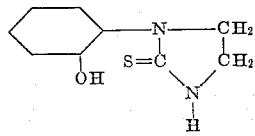

wherein X represents a member selected from the group consisting of an atom of hydrogen and an atom of chlorine.

2. An N-hydroxyphenyl-N,N'-ethylene thiourea.

3. N-p-hydroxyphenyl-N,N'-ethylene thiourea.

4. N-o-hydroxyphenyl-N,N'-ethylene thiourea.

5. N-m-hydroxyphenyl - N,N' - ethylene thiourea.

6. N-4-hydroxy-3-chlorophenyl-N,N'-ethylene thiourea.

7. N-3-hydroxy-4-chlorophenyl-N,N'-ethylene thiourea.

8. A process for preparing an N-substituted ethylene thiourea having the general formula:

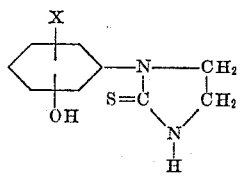

wherein X represents a member selected from the group consisting of an atom of hydrogen and an atom of chlorine, comprising reacting a diamine having the general formula:

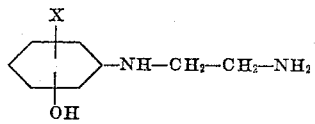

wherein X has the above meaning, with carbon disulfide, and separating the N-substituted ethylene thiourea which forms.

9. A process for preparing an N-hydroxyphenyl N,N'-ethylene thiourea comprising reacting the salt of an N-β-amino-ethyl-aminophenol with carbon disulfide, in the presence of an alkaline compound selected from the group consisting of an alkali metal carbonate and an alkali metal hydroxide, and separating the N-hydroxyphenyl-N,N'-ethylene thiourea which forms.

10. A process for preparing N-p-hydroxyphenyl-N,N'ethylene thiourea comprising reacting N-β-aminoethyl-p-aminophenol sulfate with carbon disulfide, in the presence of sodium hydroxide, and separating the N-p-hydroxyphenyl-N,N'ethylene thiourea which forms.

11. A process for preparing N-o-hydroxyphenyl-N,N'-ethylene thiourea comprising reacting N-β-aminoethyl-o-aminophenol sulfate with carbon disulfide, in the presence of sodium hydroxide, and separating the N-o-hydroxyphenyl-N,N' ethylene thiourea which forms.

12. A process for preparing N-p-hydroxy-m-chlorophenyl-N,N'-ethylene thiourea comprising reacting N-β-aminoethyl-p-hydroxy - m - chloroaminophenyl sulfate with carbon disulfide, in the presence of sodium hydroxide, and separating the N-p-hydroxy-m-chlorophenyl-N,N'-ethylene thiourea which forms.

13. A process for preparing an N-4-hydroxy-3-chlorophenyl-N,N'-ethylene thiourea comprising reacting N-β-aminoethyl-4-hydroxy - 3 - chloroaminobenzene sulfate salt with carbon disulfide, in the presence of sodium hydroxide, and separating the N-4-hydroxy-3-chlorophenyl-N,N'-ethylene thiourea which forms.

14. A process for preparing an N-3-hydroxy-4-chlorophenyl-N,N'-ethylene thiourea comprising reading N-β-aminoethyl-3-hydroxy - 4 - chloro - aminobenzene sulfate salt with carbon disulfide, in the presence of sodium hydroxide, and separating the N-3-hydroxy-4-chlorophenyl-N,N'-ethylene thiourea which forms.

REMSEN S. VAUGHN.
FREDERIC R. BEAN.

REFERENCES CITED

The following references are of record in the file of this patent:

UNITED STATES PATENTS

| Number | Name | Date |
|---|---|---|
| 1,805,954 | Morton | May 19, 1931 |

OTHER REFERENCES

Chemical Abstracts, vol. 32, p. 2534[3] citing Sergeev et al., J. gen. chem. (USSR) 7, 1390–1396 (1937Q.

Newman: Berichte, vol. 24 (1891) p. 2191.